July 24, 1956
C. T. GERDING
2,755,827
METHOD AND APPARATUS FOR CUTTING BILLETS
Filed March 2, 1953
3 Sheets-Sheet 1
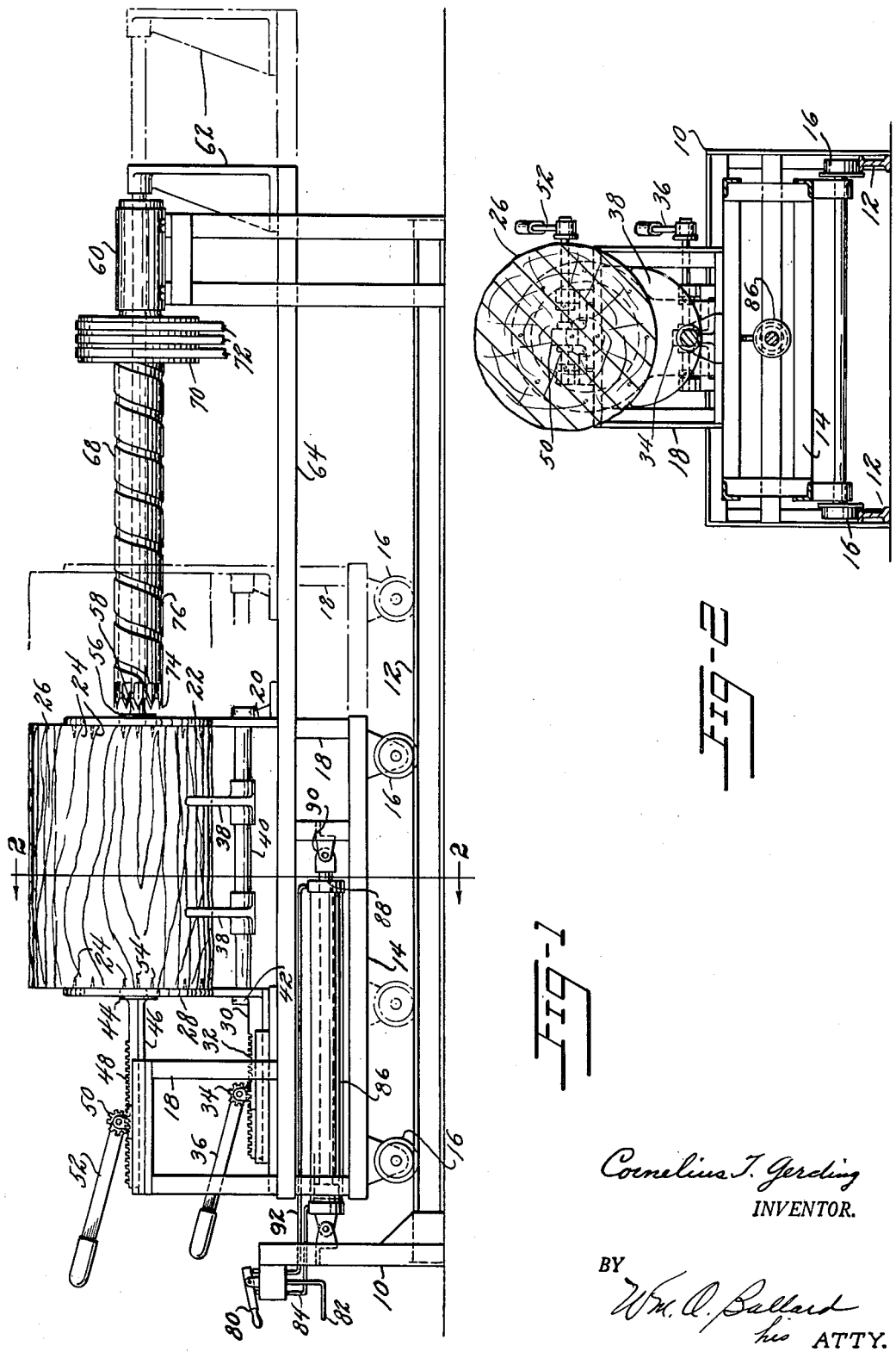
Cornelius T. Gerding
INVENTOR.
BY
Wm. O. Ballard
his ATTY.

July 24, 1956 — C. T. GERDING — 2,755,827
METHOD AND APPARATUS FOR CUTTING BILLETS
Filed March 2, 1953 — 3 Sheets-Sheet 2
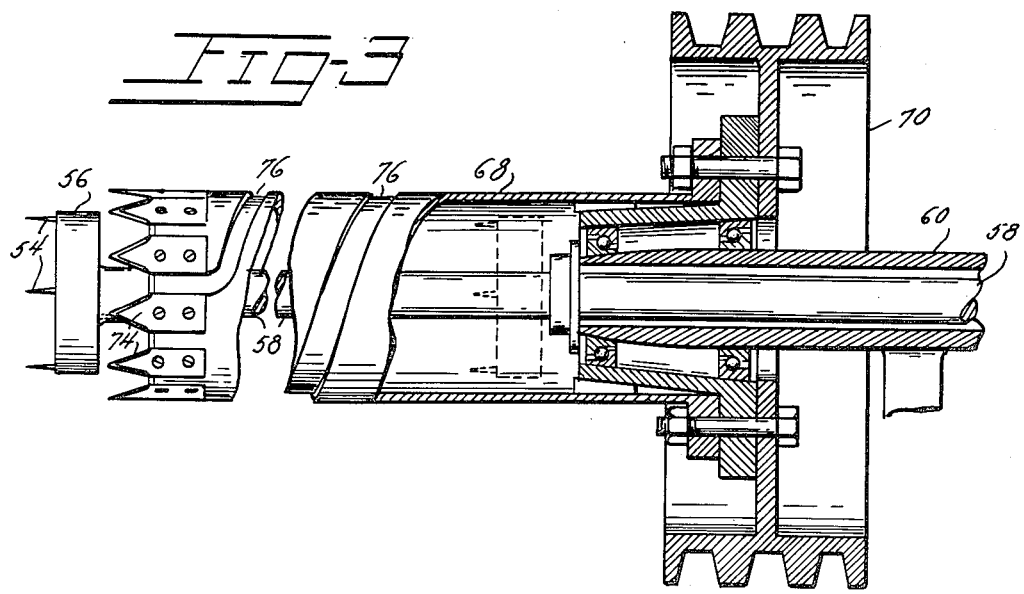
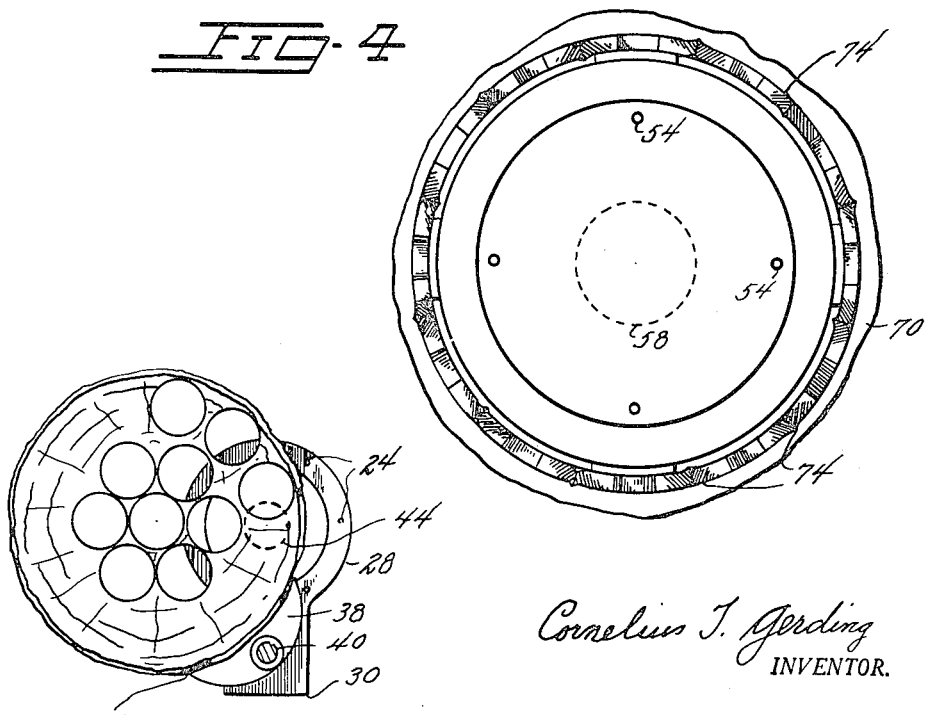
Cornelius T. Gerding
INVENTOR.
BY
Wm. O. Ballard
his attorney July 24, 1956   C. T. GERDING   2,755,827
METHOD AND APPARATUS FOR CUTTING BILLETS
Filed March 2, 1953   3 Sheets-Sheet 3
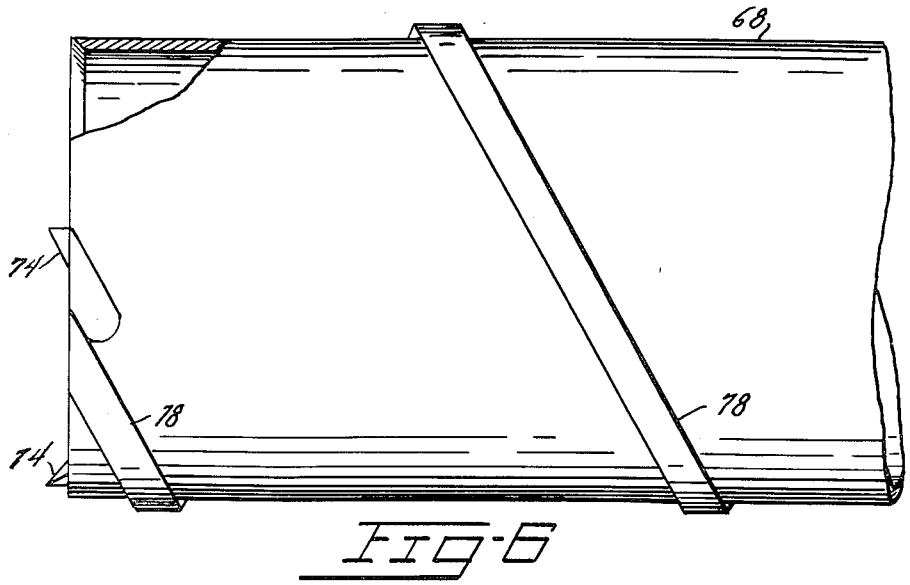
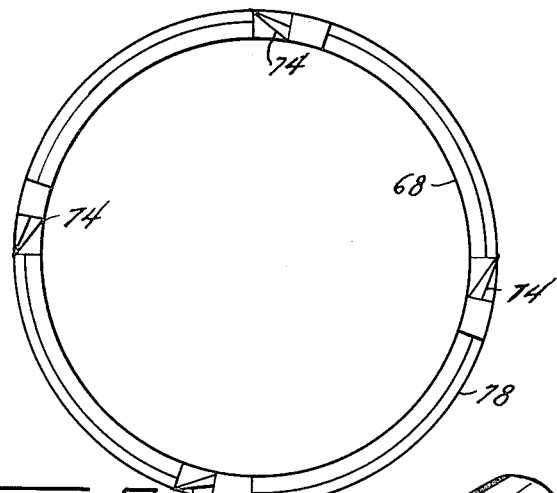
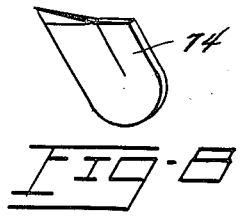
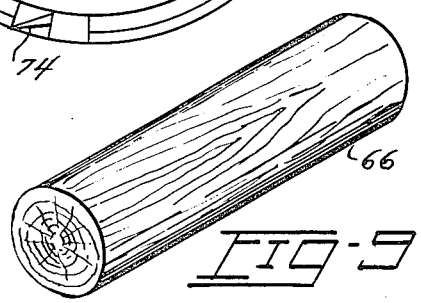
Cornelius T. Gerding
INVENTOR.
BY Wm. Q. Ballard
his attorney

United States Patent Office 2,755,827
Patented July 24, 1956

2,755,827

METHOD AND APPARATUS FOR CUTTING BILLETS

Cornelius T. Gerding, Ottawa, Ohio

Application March 2, 1953, Serial No. 339,521

3 Claims. (Cl. 143—85)

This invention relates to woodworking and is more particularly adapted to the extraction of symmetrical cores from a block to provide billets which may be further fabricated into finished articles, such as bowling pins, handles and the like.

An object of this invention is to cut a series of billets from a block, utilizing maximum portions of the block to provide usable billets with a minimum of waste.

Another object of this invention is to provide a cutter for cutting a billet directly from a block of material.

Another object of this invention is to provide a substantial mount for a cylindrical cutting tool and provide a nicely controlled feed of material thereto.

Another object of this invention is to provide a complete machine incorporating a cylindrical cutting tool and a carrier for moving material to be operated upon to and from the cutter.

And another object of this invention is to provide a method whereby billets may be cored from a block with a minimum of waste.

Other objects and advantages of this invention relating to the arrangement, operation and functions of the related elements of the structure, to various details of construction, to combination of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a side elevation of a machine embodying the invention herein;

Fig. 2 is a view on the line 2—2, Fig. 1;

Fig. 3 is an enlarged side elevation of the cutting element and its associated parts;

Fig. 4 is a view from the left of Fig. 3;

Fig. 5 is a detailed view illustrating an arrangement of cuts to obtain a maximum number of billets from a block;

Fig. 6 is a view similar to Fig. 3, illustrating a modified cutting tool;

Fig. 7 is a view from the left of Fig. 6;

Fig. 8 is a perspective view of one of the cutting elements incorporated into the structure of Fig. 6; and Fig. 9 is a perspective view of a billet cored from a block of wood by the apparatus herein disclosed.

A useful form of the invention herein comprises a frame 10 fabricated from suitable structural elements. This frame includes tracks 12, which in turn mount carriage 14 having suitable track engaging rollers 16. The carriage 14 is provided with superstructure 18, in turn fixedly mounting bracket 20 as a support for ring-shaped clamping plate 22, provided with pointed projections 24 for engaging one end of a block of material 26. This plate 22 provides one element of a clamping device with an opposing element comprising a like ring plate 28 mounted on slide 30, which slide incorporates a rack 32 engaged by pinion 34 rotatable by crank 36. This rack and pinion mechanism is carried by the super-structure 18 and is operable to adjust the plate 28 toward and from the plate 22 so that the gripping elements 24 may securely engage the opposite ends of the block 26 to securely clamp the block therebetween. These major clamping elements 22, 28 have their ring portions surround the body portion of the block 26, which is to be cored in the operation of the device herein.

The block 26 may be provided with supplemental supports 38, which also serves as guides for placing the block in position on the machihne. These guides may be mounted on bar 40, in turn mounted by bracket 20 and a supplemental bracket 42 atop the carriage 14. These combined gauge and support elements 38 may be rotatably mounted to accommodate various diameters of blocks 26, and also to add flexibility in allowing the blocks to be readily positioned so that the selected portion may be clamped between the major clamping elements 22, 28.

Additional clamping elements are provided to engage the ends of the block coaxially with the billet portion to be cored therethrough. To this end, disk 44 may be mounted on a slide 46, having rack portion 48 engageable by pinion 50, in turn rotatable by crank 52. This disk is provided with prongs or tines 54 to securely engage one end of the block body coaxially of the cut to be made therethrough. The disk 44 is likewise coaxial with the ring element 28. Opposing this disk 44 is a second minor clamping element 56 coaxial with the ring 22, and is likewise provided with tines 54. This disk is mounted on a rod 58 slidably supported in a bearing 60 mounted on the frame 10. The end of the rod 58 remote from the disk 56 is attached to a bracket 62 mounted on an extension 64 from the carriage 14. Thus the rod 68, bracket 62, and extension 64 provide a yoke mounting the clamping element 56, so that such element is movable with the carriage 14 but relatively fixed therewith.

It will be seen that the major ring clamps 22, 28 may be relatively adjusted to clamp a block 26 therebetween with the major clamping elements surrounding the body portion to be cored while the minor clamping elements 44, 56 clamp the body portion of the block which is to be cored therefrom and which is to become the billet 66. The bearing 60 also mounts a cylindrical cutting element or tool 68 which is rotatably driven by pulley 70 fixed therewith, which pulley is driven by belts 72 from a suitable source of motive power.

The cutting tool 68 may assume various forms, but it includes a cylinder coaxial with the rod 58 and thereabout and includes cutting teeth 74 and sawdust removing spirals 76 thereabout. The teeth 74 may be individual elements so that they can be replaced from time to time on the cylinder 68. The sawdust conveying spiral 76 may be a groove in the body of the cylinder 68 or ribs 78 about the body 68 with suitable angularity in the spiral to accommodate cuttings developed by the teeth 74. The teeth 74 may be of a profile and number to match the character of the stock to be cut, the extent of the cut, and the speed which may be successfully employed.

In the operation of the machine, the motive power for driving the belt 72 may be cut in and the rotary speed of the cutting tool is comparatively constant. An operator, after clamping the work 26 to the carriage, may then manipulate valve 80 for the control of fluid pressure from supply line 82 to line 84 through which fluid pressure may flow to one end of cylinder 86 fixedly attached to the frame 10, and the pressure fluid through the line 84 may then drive piston rod 88 outwardly from the cylinder. The piston rod is attached to bracket 90, in turn fixed on the carriage 14, and the carriage 14 is thus driven toward the tool. The work is thereby forced against the cutting tool, which will make a cylindrical cut through block 26 between the major and minor clamps to form a billet 66.

The minor clamping elements 44, 66 can pass into the interior of the tool while the major clamping ring may pass along the outside of the tool and even after the cut is completed the billet may be firmly held within the block and the operator, by further manipulation of the valve 80, can cause the fluid pressure to flow through line 92, and thereby withdraw the piston rod 88 into the cylinder 86, and consequently pull the carriage away from the tool. When the carriage has been fully withdrawn the double clamping mechanism still holds the work firmly in position with the billet still therein, and the operator may then manipulate the cranks 63, 52 to release the clamping means, and the billet may then be easily withdrawn from the block, and the block shifted to a succeeding position for coring another billet.

The pattern of billet removal is so easily controlled that a maximum number of billets may be cored from any selected block. As for example, with the production of bowling pins, a length of log may be taken which approximates the length of the billet desired, and this block is then placed on the positioning element 38, and the major and minor clamps operated to grip the block therebetween. The cuts may be made adjacent the outer edge of the block where, as a rule, the most desirable wood is found. If the center of the block is of a sufficient quality to warrant the coring of additional billets therefrom, such may also be done in a pattern reducing the waste from the log to a minimum. The speed of the cut is of course determined by the character of the wood, the type of cutter tooth adopted, and the speed of rotation of the tool, and the yoke connection between the carriage and the minor clamp holds the billet firmly during and after the cutting operation and until the carriage has been withdrawn and the clamps positively released. This double holding reduces any tendency toward binding during the cutting operation or withdrawal of the block from the cutter.

There is herein disclosed a machine which is operable to cut the maximum number of billets available from a piece of work in a minimum of time and is easily controlled and manipulated by a single operator.

It is to be understood that the above description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and desired to secure by United States Letters Patent:

1. A billet forming machine comprising a frame, a longitudinally fixed hollow cylindrical cutter mounted on said frame, means for rotating said cutter about its axis, a carriage mounted on said frame, means for moving said carriage toward and away from said cutter in a direction parallel to the axis of said cutter, a first positive clamping means carried by said carriage and disposed coaxially with the axis of the cutter and including a coaxial pair of opposing ring shaped plates having central openings larger in diameter than the outer diameter of said cutter, and a second positive clamping means disposed coaxially with the axis of the cutter and comprising a pair of coaxially disposed disks having outer diameters smaller than the inner diameter of said hollow cylindrical cutter, and means on said carriage for positively and independently adjusting the distance between the elements of each pair of clamping members.

2. A billet forming machine comprising a frame, a horizontal longitudinally fixed hollow cylindrical cutter rotatably mounted upon said frame, a carriage mounted for rectilinear movement with respect to said frame, means for moving said carriage toward and away from said cutter in a direction parallel to the axis of rotation of said cutter, a horizontal work support mounted on said carriage and movable with respect to said carriage toward and from the axis of said cutter, a pair of spaced ring shaped clamping members mounted on said carriage and coaxial with the axis of said cutter, and having openings therethrough larger in diameter than the outer diameter of said hollow cylindrical cutter, the first of said pair of clamping members being fixed with respect to said carriage, and means on said carriage for positively moving the second of said pair of clamping members toward or away from said first clamping member to rigidly clamp a work piece therebetween, a third clamping member in axial alignment with said hollow cylindrical cutter and axially fixed with respect to said carriage and smaller in diameter than the internal bore of the cutter, and a fourth clamping member mounted on said carriage coaxial with and smaller in diameter than the internal bore of said cutter, means on said carriage for positively positioning said fourth clamping member axially of said cutter and with respect to said fixed third clamping member, means for rotating said hollow cylindrical cutter about its axis, and means for moving said carriage toward said cutter while a work piece is supported upon said work support and is rigidly clamped between said pair of ring shaped clamping members and between said third and fourth clamping members.

3. The structure set forth in claim 2, wherein the movable member of said first pair of clamping members and said fourth clamping member include racks slidably mounted in said carriage, and the means for moving said movable member and said fourth clamping member comprise separate pinions rotatably mounted upon said carriage and respectively engaging said racks.

References Cited in the file of this patent

UNITED STATES PATENTS

| | | |
|---|---|---|
| 42,445 | Reid | Apr. 19, 1864 |
| 222,970 | Wenchel | Dec. 23, 1879 |
| 245,817 | Grill | Aug. 16, 1881 |
| 360,181 | Treat et al. | Mar. 29, 1887 |
| 786,849 | Sheppard | Apr. 11, 1905 |
| 802,184 | Farnum | Oct. 17, 1905 |
| 1,108,912 | Koons | Sept. 1, 1914 |
| 1,356,019 | See | Oct. 19, 1920 |
| 2,463,799 | Palmer | Mar. 8, 1949 |
| 2,680,457 | Kakuk | June 8, 1954 |